United States Patent
Huxoll

(10) Patent No.: US 6,799,189 B2
(45) Date of Patent: Sep. 28, 2004

(54) SYSTEM AND METHOD FOR CREATING A SERIES OF ONLINE SNAPSHOTS FOR RECOVERY PURPOSES

(75) Inventor: Vernon F. Huxoll, Austin, TX (US)

(73) Assignee: BMC Software, Inc., Houston, TX (US)

(*) Notice: Subject to any disclaimer, the term of this patent is extended or adjusted under 35 U.S.C. 154(b) by 150 days.

(21) Appl. No.: 10/002,274

(22) Filed: Nov. 15, 2001

(65) Prior Publication Data

US 2003/0093444 A1 May 15, 2003

(51) Int. Cl.7 .............................................. G06F 17/30
(52) U.S. Cl. ...................... 707/204; 707/202; 710/105; 711/114; 711/162
(58) Field of Search .......................... 710/105; 711/114, 711/162; 707/204, 202

(56) References Cited

U.S. PATENT DOCUMENTS

| | | | | |
|---|---|---|---|---|
| 5,613,113 A | * | 3/1997 | Goldring | .................... 707/202 |
| 5,649,152 A | * | 7/1997 | Ohran et al. | ................. 711/114 |
| 6,078,932 A | * | 6/2000 | Haye et al. | .................. 707/204 |
| 6,081,875 A | * | 6/2000 | Clifton et al. | .............. 711/162 |
| 2002/0124124 A1 | * | 9/2002 | Matsumoto et al. | ........ 710/105 |

* cited by examiner

Primary Examiner—Charles Bones
(74) Attorney, Agent, or Firm—Wong, Cabello, Lutsch, Rutherford & Brucculeri, LLP

(57) ABSTRACT

A method and system for creating a series of online snapshots for recovery purposes. A series of concurrent, overlapping snapshots (e.g., file snapshots or database file snapshots) may be created over a user-specified time interval at a user-specified frequency. Monitoring for a recovery indication may occur during the user-specified time interval. Once it is established that a "recovery" is necessary, a snapback procedure may be implemented to iteratively restore one or more pre-update snapshot images. Between restore iterations, testing to determine if the problem still exists may occur. When the testing of the data results in a determination that the problem is resolved, no further restores are necessary.

35 Claims, 4 Drawing Sheets

SYSTEM AND METHOD FOR CREATING A SERIES OF ONLINE SNAPSHOTS FOR RECOVERY PURPOSES

BACKGROUND OF THE INVENTION

1. Field of the Invention

The present invention relates to recovery management software, and more particularly to a system and method for creating a series of online snapshots for recovery purposes while online user access to the data is available.

2. Description of the Related Art

With the proliferation of large database systems, the need for effective recovery solutions has become a critical requirement for the safe management of customer data. Data management requires time, storage and processor resources, yet all are in ever-shorter supply in today's complex computing environment. Traditional backups require either a lengthy outage of the database while a cold copy is performed or the consumption of significant system resources while online backups are taken. These traditional techniques are inadequate to meet the needs of today's high availability requirements. Making backups of mission critical data stored in database files on open systems is part of doing business. One problem with creating a consistent point-in-time backup or image is that it requires taking the system offline, thus decreasing data availability.

It is desirable to have an easy, reliable, and unobtrusive method for creating or obtaining a consistent point-in-time copy or image of a database (e.g., an Oracle database), or any file or file system, while the data remains online and available for update. In the case of an Oracle database, for example, traditional Oracle warm backup requires expensive archiving of online redo logs. It is desirable to enable online database backups without requiring the overhead of logs to be maintained and those logs to be applied in order to recover the data.

It is also desirable to create or obtain a consistent point-in-time copy or image of data with or without specialized hardware (e.g., Intelligent Storage Devices). As used herein, an "Intelligent Storage Device" is a storage device that provides one or more of: continuous data availability, high reliability, redundancy of critical components (e.g., mirroring), nondisruptive upgrades and repair of critical components, high performance, high scalability, and access to shared and secured heterogeneous server environments (e.g., mainframes, UNIX-based systems, Microsoft Windows-based systems). Typically, ISDs are used for backup and recovery, data replication, and disaster recovery.

Various hardware vendors offer Intelligent Storage Device (ISDs): Hitachi Data Systems (Freedom Storage 7700E with ShadowImage mirrors), Hewlett-Packard Company (SureStore Disk Array XP256 with Business Copy mirrors), and EMC Corporation (Symmetrix with Timefinder mirrors), among others.

It also desirable to have an easy, reliable, fast, and clean method for restoring a consistent point-in-time copy or image of a database (e.g., an Oracle database), or any file or file system, when some event happens that causes a "recover" of the data to be necessary. Thus, the nature of the event that causes a "recover" of the data to be necessary is irrelevant.

For the foregoing reasons, there is a need for a system and method for creating a series of online snapshots for recovery purposes while online user access to the data remains available.

SUMMARY OF THE INVENTION

The present invention provides various embodiments of a method and system for creating a series of online snapshots for recovery purposes. In one embodiment, one or more snapshots (e.g., file snapshots or database file snapshots) may be created over a user-specified time interval at a user-specified frequency. The one or more snapshots may be a series of concurrent, overlapping snapshots constructed by creating snapshots over a user-specified time interval at a user-specified frequency. For each snapshot, one or more files may be targeted for snapback by being registered with a snapshot software component technology by a software utility (e.g., a file backup and recovery management utility or a database backup and recovery management utility). In one embodiment, the files targeted for snapback may be database files associated with a database. Alternatively, the files targeted for snapback may be any type of computer-readable files. Prior to registering one or more files with the snapshot software component technology, initialization processing may be executed. The initialization processing may prepare the one or more files for processing by the client utility.

The snapshot software component technology may determine an appropriate methodology to handle read requests and write requests received during the snapshot of each registered file. The appropriate methodology chosen for each registered file may be independent of the chosen methodology for the other registered files. In one embodiment, one of the following methodologies may be chosen for each registered file: a software based methodology using a memory cache, a software based methodology using a disk cache, or a hardware based methodology using an intelligent storage device.

After determining an appropriate methodology, the snapshot software component technology may be started. In the case of a database snapshot, prior to starting the snapshot software component technology, the database may be synchronized or stopped and quiesced. It is noted that various database management systems may synchronize and/or stop and/or quiesce the database. In one embodiment, the synchronizing or quiescing may shut the database down. In another embodiment, the synchronizing or quiescing may place database objects in a certain mode that is proprietary to a particular DBMS. After the synchronization or quiesce is completed, the database may be restarted.

In the case of the hardware based methodology, the starting procedure may include splitting the mirror volume 204 from the primary volume 200, and making the data on the mirror volume 204 available for processing by the device driver 112 (shown in FIG. 2).

After the snapshot software component technology has been started, read requests and write requests may be operable to be performed concurrently with the snapshot processing of each registered file. For example, the processing of read requests from the registered files and write requests to the registered files may occur concurrently with the snapshot processing of each registered file.

Processing for the software based methodology may include: capturing client reads for each registered file; for each captured client read, if the read is for updated data, returning the data from the cache; for each captured client read, if the read is for non-updated data, returning the data from the registered file; capturing writes to each registered file; for each captured write to a registered file, prior to allowing the captured write to complete, saving a pre-image of the appropriate data block of the registered file to a cache if the given data block of the registered file has no previously saved pre-image in the cache.

Processing for the hardware based methodology may include: capturing client reads for each registered file; for each captured client read, returning the data from a mirrored volume; allowing normal write processing to a primary volume for all write requests, without capturing them.

Each registered file may be targeted for snapback such that the processing by the client utility is consistent with the state of each registered file at the point in time of the start of the snapshot software component technology. In the case of a database being targeted for snapback, the processing by the client utility may be consistent with the state of the database at the point in time of the start of the snapshot software component technology. Targeting each registered file for snapback may include copying a pre-image version of updated data to a cache. The location from which the pre-image version of updated data is retrieved during the snapback may be dependent upon the chosen methodology (i.e., software based or hardware based). If the chosen methodology is the software based methodology, the location from which the pre-image version of updated data is retrieved during the snapback may be the memory cache or alternatively may be the disk cache. If the chosen methodology is the hardware based methodology, the location from which the pre-image version of updated data is retrieved during the snapback may be the intelligent storage device.

In one embodiment, the snapshot software component technology may be stopped when deemed appropriate by the backup and recovery management utility in order to prepare for snapback of the registered files. After the snapback has completed, termination processing may be executed.

The user may specify the start time of the first snapshot instance, and the user may also specify the time interval to wait prior to starting the next snapshot instance. For example, the user may specify ten minutes as a uniform time interval for the series of snapshot instances. The time intervals between the start times of adjacent snapshot instances need not be uniform. Other methods may be used to determine the interval between the start times of adjacent snapshot instances, including user-defined methods. In one embodiment, the user may specify an ending time, and/or a certain number of snapshot instances. Any number of snapshot instances may be scheduled by the user, subject to the limitations of the user's environment (e.g., amount of disk space available for the snapshots to be stored).

Monitoring for a recovery indication may occur during the user-specified time interval. For purposes of the restore using the series of snapshot instances, the nature or reason for the "recovery" request are irrelevant.

Once it is established that a "recovery" is necessary, a snapback procedure may be implemented. The snapback process may restore one or more pre-update snapshot images. The process of restoring the pre-update snapshot images may be iterative. The smaller the number of updates, the quicker the restore process will complete. A first pre-update snapshot image of the one or more pre-update snapshot images may be restored. The data may then be tested to determine if the problem has been resolved. In the event that the problem still exists, a second pre-update snapshot image may be restored, followed by a second testing of the data to determine if the problem has been resolved. In the event that the problem still exists, the process of restoring a subsequent pre-update snapshot image followed by testing of the data to determine if the problem still exists may be repeated until it is determined by testing that the problem has been resolved.

BRIEF DESCRIPTION OF THE DRAWINGS

A better understanding of the present invention can be obtained when the following detailed description of various embodiments is considered in conjunction with the following drawings, in which.

Figure 1:
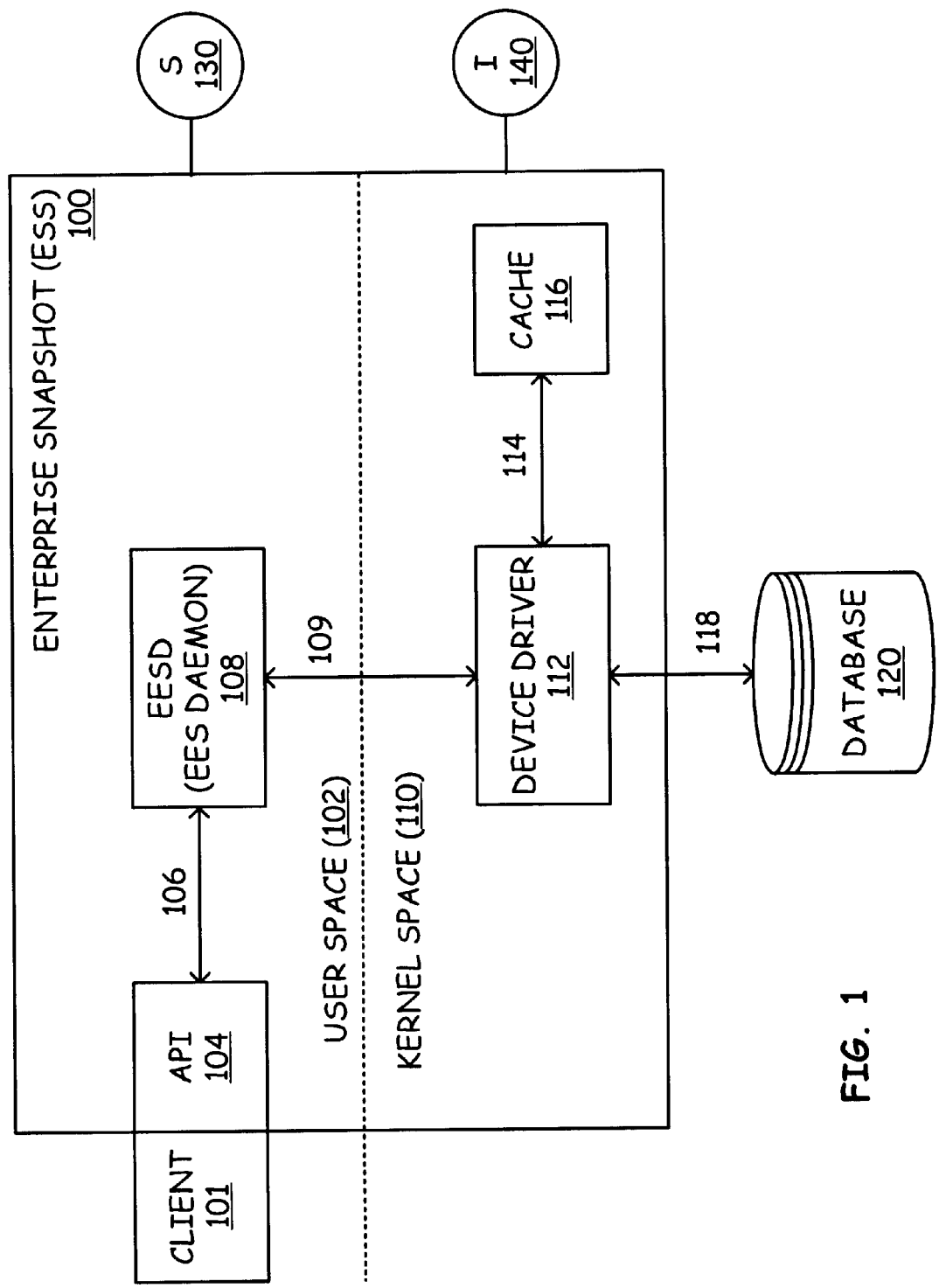
FIG. 1 illustrates a software-based data snapshot, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Incorporation by Reference

U.S. application Ser. No. 10/002,269, now abandoned, titled "System and Method for Creating Online Snapshots" and filed concurrently herewith, whose inventor is Vernon F. Huxoll, is hereby incorporated by reference as though fully and completely set forth herein.

Figure 2:
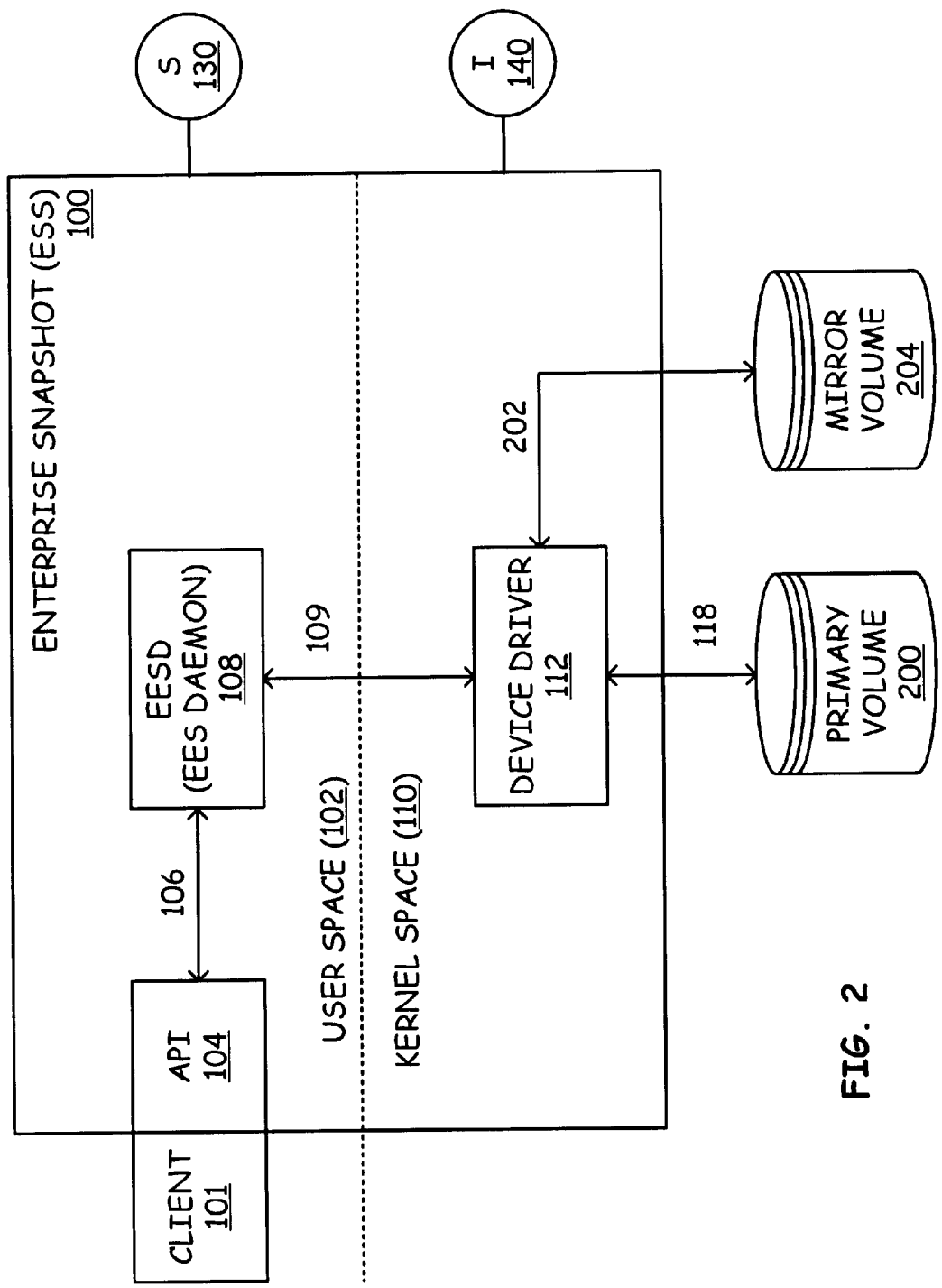
FIG. 2 illustrates a hardware-based data snapshot, according to one embodiment.

Two distinct methods to secure a snapshot are discussed in FIGS. 1 and 2. In FIG. 1, one embodiment of a software-based data snapshot is shown. In FIG. 2, one embodiment of a hardware-based data snapshot is shown. Both FIGS. 1 and 2 refer to data snapshots on UNIX-based systems, for illustration purposes only. Data snapshots for other open or distributed systems (e.g., Microsoft Windows NT) may have slightly different implementations. For example, an ESS daemon (essd) 108, as shown in FIGS. 1 and 2, may be replaced with an ESS Service for Microsoft Windows NT implementations.

The invention is not intended to be limited to UNIX-based systems as described in FIGS. 1 and 2, but on the contrary, it is intended to be portable to various open or distributed systems, (e.g., open or distributed systems presently known or developed in the future).

As used herein, a "snapshot" is a consistent point-in-time image of data from any file, file system, or database (e.g., an Oracle database). The "snapshot" image may be used in various applications (e.g., data backup, data migration, log analysis, database replication, among others).

As used herein, a "snapback" is the action of writing pre-image data blocks (i.e., snapshot images) back to the target datafiles that underlie any file, file system or database (e.g., an Oracle database). The "snapback" may include a fast restore of the data or datafile back to a particular point in time.

In FIG. 1, a software-based Enterprise Snapshot (ESS) is shown utilizing a cache (e.g., a system memory cache or a disk cache) to store data required by snapshot processing. This software-based ESS may require no special hardware or database configuration. In FIG. 2, a hardware-based ESS is shown utilizing intelligent storage devices that exploit mirroring technology. ESS is an enabling software technology intended to be used with other utility software programs (e.g., a comprehensive backup and recovery management utility).

In the case of a backup and recovery management utility, the backup and recovery management utility may utilize the snapshot (i.e., a "virtual image") maintained by ESS to make a consistent point-in-time copy of the data. Thus, the snapshot copy of the data is an external entity, whereas the "virtual image" presented to the backup and recovery management utility by ESS is an internal entity.

A client 101 may be any comprehensive backup and recovery management utility (e.g., Patrol Recovery for Oracle (PRO) provided by BMC Corporation). The client 101 may communicate with the ESS 100 through a function call to a shared library (not shown). The client 101 may reside on a local host or a remote host, thus allowing for a more transparent distributed usage.

In one embodiment, the shared library may export a session based Application Programming Interface (API) 104 that may be accessed directly by the client 101. The session based API may give the user more control over locking, tracing, and thread-based storage. Any ESS API call 104 (e.g., essCheck, essGetErrorString, essGetPrimaryError, essGetSecondaryError, essInherit, essInit, essInitIntercept, essInitSnapshot, essIsSnapshotInstalled, essIsSnapshotRunning, essPError, essRead, essRegister, essRestart, essStart, essStop, essTerm) may be passed to the ESS daemon 108. The ESS daemon (essd) 108 may then pass the API request on to a device driver 112, via a communication link 109.

It is noted that a procedural API (as opposed to a distributed object type of interface) may also be used. Any number of clients may concurrently call the procedural API and obtain a session with the ESS daemon. In a single threaded embodiment, ESS may block concurrent access to daemon services. This lack of concurrent access to daemon services may be non-disruptive to client applications, as client requests may be queued and subsequently processed serially.

Communication between the ESS daemon 108 and the client 101 may be achieved through remote procedure calls (RPC), message queues, and/or some other communication method, represented by arrow 106. It is noted that communication methods that allow for asynchronous behavior, may also allow for multi-threaded design to improve performance.

It is noted that the client 101, the API 104, and the ESS daemon 108 may exist in user space 102, in one embodiment. In the software-based ESS shown in FIG. 1, the device driver 112 and a cache 116 may reside in kernel space 110, in one embodiment.

Various interfaces may connect to the ESS 100, either at the user space level or at the kernel space level. These interfaces may be independently deployable. For example, interface 130 is represented by the letter S, indicating a snapshot interface, and interface 140 is represented by the letter I, indicating an intercept interface.

In one embodiment, the device driver 112 may be designed to be portable to various versions of Unix (e.g., HPUX, AIX, and Solaris) and to various file systems (e.g., UFS, JFS, NFS, etc). Typically, some portion of device drivers is platform dependent, by modularizing the elements of the device driver 112, platform dependent modules may be separated from common modules. The device driver 112 may monitor and control input and output (I/O) for each registered file.

In one embodiment, the device driver 112 may adhere to the Device Driver Interface/Device Kernel Interface (DDI/DKI) specification, with the goal of being dynamically loaded, when the operating system allows for dynamic loading of device drivers.

The device driver 112 may be connected to the cache 116 via an Application Programming Interface (API) 114. Similarly, the device driver 112 may be connected to the database 120 via standard file system I/O 118.

The cache 116 may be a system memory cache or a disk cache. In the hardware-based ESS shown in FIG. 2, the device driver 112 may reside in kernel space 110, in one embodiment; the device driver 112 may communicate with a mirror volume 204, via a communication link 202. The mirror volume 204 may be one of several mirrors associated with an intelligent storage device. The mirror volume 204 may be split off from the primary volume 200 such that the snapback procedure may copy from the mirror volume 204.

In FIG. 1, the data targeted for snapback is illustrated as a database 120, however, the data may just as easily be a single file or a file system or any other data source definable by the user. In FIG. 2, the data targeted for snapback is illustrated as a primary volume with a hardware mirror, the data residing in the mirrored pair may be a database, a single file, a file system, or any other data source definable by the user.

The client 101 may make a series of API calls to initialize snapshot processing. The client 101 may then register files (e.g., files related to database 120) with ESS 100 for snapshot processing. The registered files may be logically grouped such that they have the same consistency point. As each file is registered, ESS 100 may determine the most appropriate snapshot methodology to use (e.g., a software based methodology using a memory cache, a software based methodology using a disk cache, a hardware based methodology using an intelligent storage device) for each registered file. After file registration is complete, the client 101 may direct ESS to start snapshot processing.

In the case of a database snapshot, the client 101 may require some form of database coordination in order to quiesce or synchronize the database objects before the start of the snapshot. This database coordination may be integrated into the client 101 processing. After a brief outage, the database may be restarted and made available for update. Database update activity and the database snapshot may run concurrently. By allowing the database update activity to run in parallel with the database snapshot, data availability may improve. The database outage shrinks to only a small window of time during which the snapshot process is started, compared to a much larger window of time required for a traditional, offline backup.

The resulting database snapshot is an image of the database file(s) as they were just before the start of the database snapshot (i.e., a consistent point-in-time image). In the case of a database, the snapshot image may provide a full point-in-time restore point just as if the recovery process were using a traditional offline backup.

It is noted that a database outage may not be required, in some embodiments. For example, in the case of an Oracle database, the client utility (e.g., Patrol Recovery for Oracle) may utilize snapshot to provide snapback services to an online database. Prior to starting the snapshot software component technology, the database objects (e.g., tablespaces) may be placed in an extended logging mode (e.g., backup mode, in Oracle). Prior to the database recovery management software utility snapshot processing each registered database file, the database objects may be removed from the extended logging mode, and the database may be synchronized.

By utilizing snapshot processing, the time that the database is in backup mode (i.e., backup mode is a database state typically required by native Oracle online database backup) may be reduced, thus dramatically reducing the number of Oracle archive log files produced. This reduction in the number of Oracle archive log files produced may, in turn, reduce system load and may speed recovery processing.

Alternatively, in an embodiment where the database can be shutdown for a brief period of time, prior to starting the snapshot software component technology, the database may be stopped and quiesced (e.g., shutting the database down). And prior to the database recovery management software utility snapshot processing each registered database file, the database may be restarted.

Upon the start of the snapshot processing, the device driver 112 may set a flag and may commence watching every I/O for each registered file. When an update to a registered file is detected by the device driver 112, the cache 116 may be used as a location to save the pre-update version of the data (e.g., the version of the data that exists in the database 120 prior to allowing the update action to complete) before the update takes place.

As the client 101 progresses through the database snapshot process, the client 101 may read the data (e.g., just as it would if there were no snapshot). The snapshot software component technology may intercept the client read and may either supply a pre-image from the cache 116, if there is one, or let the client read the unupdated data from the database 120. As used herein, a "pre-image" is a pre-update version of data for which a write request has been received but not yet processed. During a unique snapshot processing instance, each data block (i.e., a data block may include a portion of a registered file) may have only one "pre-image" saved to the cache 116. Subsequent writes received during the unique snapshot processing instance for a given data block of a registered file which already has a "pre-image" stored in the cache 116 may be directly routed by the device driver 112 to the database 120, without any writing to the cache 116. Thus, the client 101, through the routing by the device driver, may read non-updated data from each registered file and may receive pre-images from the cache 116, ensuring that the data snapshot is consistent with the state of the file at the point-in-time of the start of the snapshot.

In one embodiment, when the ESS system is started, a maximum cache size may be specified by a user. Alternatively, if the user does not set the maximum cache size, a default value for the maximum cache size may be used. The maximum cache size may represent a limit to which the cache may grow. For the case where the cache 116 is a memory cache, memory may be allocated on an as-needed basis, and deallocated when cache storage is no longer needed, in one embodiment. For the case where the cache 116 is a disk cache, disk space may be allocated on an as-needed basis, and deallocated when disk storage is no longer needed, in one embodiment. In addition, pre-images may be purged from the cache 116 after the client 101 has read them, thus freeing space in the cache 116 for new data. The user may tune and/or configure the ESS cache for purposes of optimizing performance.

As shown in the hardware-based ESS in FIG. 2, ESS may detect if target data (i.e., a registered file) resides on an ISD. When such a condition is detected, ESS may separate the mirror volume 204 from its primary volume 200. ESS may then redirect the client to read non-updated data from the mirror volume 204. Update activity may be allowed to proceed against the primary volume 200 while the snapshot image is retained by the separated mirror volume 204. After a snapback restore from the separated mirror volume has taken place or the snapshot image is no longer needed, ESS may initiate the reestablishment and synchronization of the connection between the primary volume 200 and its mirror volume 204.

It is noted that a data snapshot taken by the hardware-based ESS is totally transparent to the client and, more importantly, to the user. ESS may determine the best available method (i.e., software-based or hardware-based) on a registered-file-by-registered-file basis. For example, a database recovery management process may involve producing a snapshot copy of many files. Some of the files may be on supported and properly mirrored ISDs while others may not. ESS may choose the best method for each registered file, producing hardware-based snapshots when possible and, as an alternative, producing software-based snapshots. A hardware-based snapshot is usually preferred since no cache is required.

ESS is hardware neutral. Data targeted for snapshot may be spread across any combination of supported ISD platforms. The end product, a data snapshot, may result regardless of the ISD platform used.

ESS may run as a separate process in UNIX-based systems. As a separate process, ESS is independently configurable from the client processes, or any other processes. ESS may be tightly integrated with the client software. This independence/integration paradigm may yield flexibility and ease of operation. ESS may monitor the status of the client process, thus resources allocated by ESS on behalf of the client may be automatically freed if the client fails. Any ISD volume pairings separated by ESS may also be restored and resynchronized automatically if the client fails.

ESS may monitor the operating environment. In the case of the cache being a memory cache, if no client programs are currently utilizing cache storage managed by ESS, the ESS system may automatically free the cache memory. The next time cache storage is required, memory may be reallocated on an as-needed basis.

Figure 3:
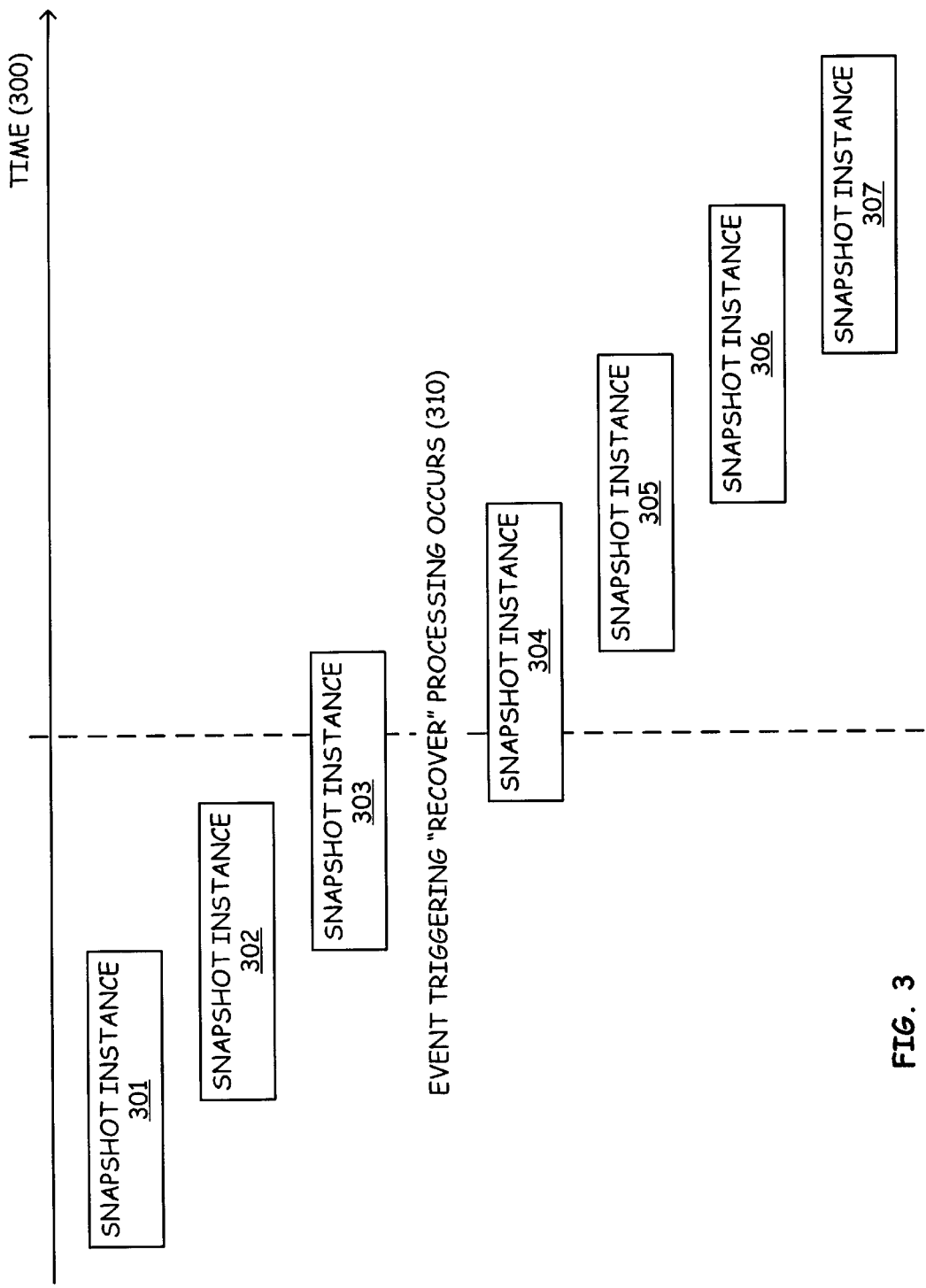
FIG. 3 is a flowchart illustrating a series of concurrent, overlapping snapshots, according to one embodiment.

FIG. 3: A Series of Concurrent, Overlapping Snapshots

FIG. 3 is a flowchart illustrating an embodiment of a series of concurrent, overlapping snapshots. The passage of time is indicated by the time line 300. As shown in FIG. 3, a series of snapshot instances may be scheduled or created by a user. The user may specify the start time of the first snapshot instance (e.g., snapshot instance 301), and the user may also specify the time interval to wait prior to starting the next snapshot instance. For example, the user may specify ten minutes as a uniform time interval for the series of snapshot instances. Using that ten minute value, with the start time of snapshot instance 301 set to time $T_0$, the remaining snapshot instances shown in FIG. 3 may be scheduled to start at the following times: snapshot instance 302 to start at time $T_0+10$ minutes; snapshot instance 303 to start at time $T_0+20$ minutes; snapshot instance 304 to start at time $T_0+30$ minutes; snapshot instance 305 to start at time $T_0+40$ minutes; snapshot instance 306 to start at time $T_0+50$ minutes; snapshot instance 307 to start at time $T_0+60$ minutes, and so on, until such time as the user specifies the snapshots should end. The time intervals between the start times of adjacent snapshot instances need not be uniform. Other methods may be used to determine the interval between the start times of adjacent snapshot instances, including user-defined methods.

In one embodiment, the user may specify an ending time, and/or a certain number of snapshot instances. It is noted that the snapshot instances shown in FIG. 3 are limited to seven snapshot instances for illustration purposes only; thus, any number of snapshot instances may be scheduled by the user, subject to the limitations of the user's environment (e.g., amount of disk space available for the snapshots to be stored).

Referring back to the example of a user-specified uniform ten minute time interval for the series of snapshot instances, it is shown in FIG. 3 that at a point in time between time $T_0+30$ minutes and time $T_0+40$ minutes, an event 310 triggering "recover" processing occurs. For purposes of the restore using the series of snapshot instances, the details of the event that triggers recover processing are irrelevant.

Once it is established that a "recovery" is necessary, a snapback procedure may be implemented. The snapback process may copy the pre-update version of the data from the cache (if the software methodology is used) or from the mirrored volume (if the hardware methodology is used). The smaller the number of updates, the quicker the restore process will complete. Continuing with the same example, a snapback to the state of the data at the beginning of the snapshot instance 304 may be accomplished by copying the pre-update version of the data related to the updates that were processed since the time that the snapshot instance 304 was started. Once the data has been restored to the state it was in at the time of the beginning of the snapshot instance 304, the user may then test the data to establish whether the issue or problem that caused the "recovery" process to initiate has been resolved. If the issue or problem that caused the "recovery" process to initiate has been resolved, the processing is complete; otherwise, the "restore" process may repeat with the next earlier snapshot instance (i.e., snapshot instance 303), followed by a testing process to determine if the issue is resolved. If needed, (i.e., if the problem is still not resolved) the "restore" process may repeat with the next earlier snapshot instance (i.e., snapshot instance 302), and so on, until testing reveals that the data has been restored to a "pre-error condition state". At this point further processing my be applied to the data such as recovery from database logs or any other recovery procedure deemed appropriate.

Figure 4:
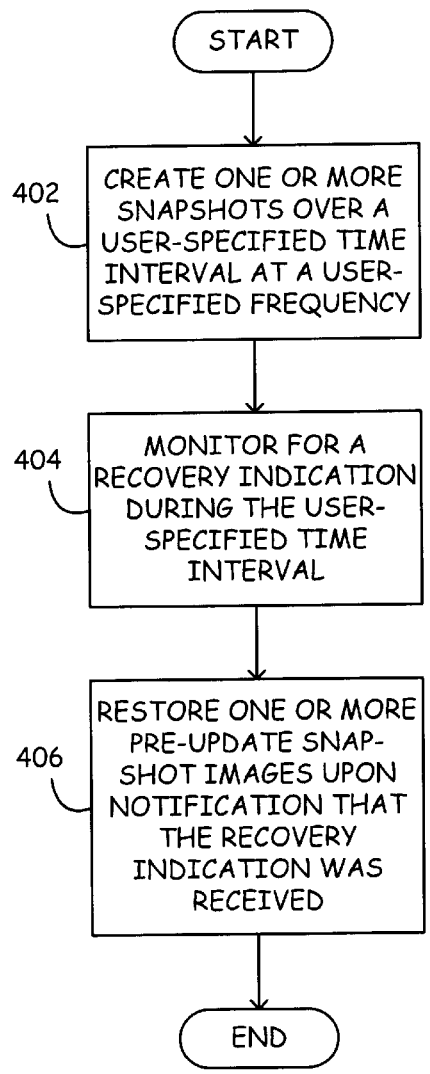
FIG. 4 is a flowchart illustrating creation of a series of online snapshots for recovery purposes, according to one embodiment.

FIG. 4: Creation of a Series of Online Snapshots for Recovery Purposes

FIG. 4 is a flowchart of an embodiment of a system and method for creating a series of online snapshots for recovery purposes.

In step 402, one or more snapshots (e.g., file snapshots or database file snapshots) may be created over a user-specified time interval at a user-specified frequency. As discussed under FIG. 3, the time interval and frequency at which the series of snapshots are initiated may be user-specified. Further, detailed steps for creating each snapshot is discussed under FIG. 5.

In step 404, monitoring for a recovery indication may occur during the user-specified time interval. As discussed under FIG. 3, the nature or reason for the "recovery" request are irrelevant. The nature or reason for the "recovery" request may be referred to as a problem with the data.

In step 406, one or more pre-update snapshot images may be restored upon notification that the recovery indication was received. The process of restoring the pre-update snapshot images may be iterative. The smaller the number of updates, the quicker the restore process may complete. A first pre-update snapshot image of the one or more pre-update snapshot images may be restored. The data may then be tested to determine if the problem has been resolved. In the event that the problem still exists, a second pre-update snapshot image may be restored, followed by a second testing of the data to determine if the problem has been resolved. In the event that the problem still exists, the process of restoring a subsequent pre-update snapshot image followed by testing of the data to determine if the problem has been resolved may be repeated until it is determined by testing that the problem has been resolved.

Figure 5:
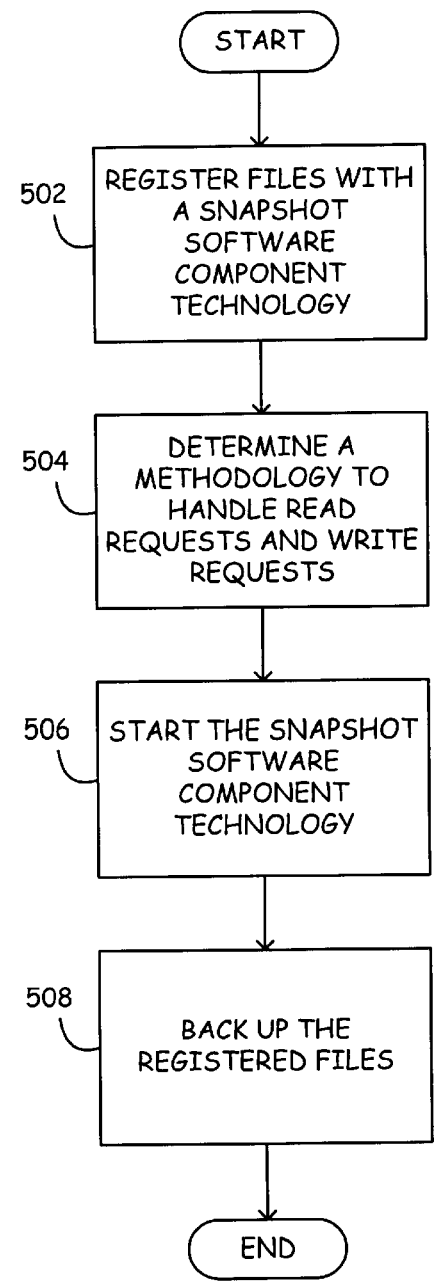
FIG. 5 is a flowchart illustrating a system and method for creating online snapshots, according to one embodiment.

FIG. 5: Creating Online Snapshots

FIG. 5 is a flowchart of an embodiment of a system and method for creating online snapshots.

In step 502, one or more files may be registered with a snapshot software component technology by a software utility (e.g., a file backup and recovery management utility or a database backup and recovery management utility). In one embodiment, the snapshot software component technology may provide services to the software utility. The snapshot software component technology may also be encapsulated into the software utility.

In one embodiment, the files may be database files associated with a database. Alternatively, the files may be any type of computer-readable files. Prior to registering one or more files with the snapshot software component technology, initialization processing may be executed. The initialization processing may prepare the one or more files for the snapshot.

In step 504, the snapshot software component technology may determine an appropriate methodology to handle read requests and write requests received during the file snapshot of each registered file. The appropriate methodology chosen for each registered file may be independent of the chosen methodology for the other registered files. In one embodiment, one of the following methodologies may be chosen for each registered file: a software based methodology using a memory cache, a software based methodology using a disk cache, or a hardware based methodology using an intelligent storage device.

In step 506, after an appropriate methodology has been determined, the snapshot software component technology may be started. In the case of a database snapshot, prior to starting the snapshot software component technology, the database may be synchronized or stopped and quiesced (e.g., by the database backup and recovery management utility). It is noted that various database management systems may synchronize and/or stop and/or quiesce the database. In one embodiment, the synchronizing or quiescing may shut the database down. In another embodiment, the synchronizing or quiescing may place database objects in a certain mode that is proprietary to a particular DBMS. After the synchronization or quiesce is completed, the database may be restarted. The database synchronization or quiesce may be provided in numerous ways (e.g., through a native database capability, or through shutting the database down, among others).

In the case of the hardware based methodology, the starting procedure may include splitting the mirror volume 204 from the primary volume 200, and making the data on the mirror volume 204 available for processing by the device driver 112 (shown in FIG. 2).

After the snapshot software component technology has been started, read requests and write requests may be operable to be performed concurrently with the snapshot processing of each registered file. For example, the processing of read requests from the registered files and write requests to the registered files may occur concurrently with the snapshot processing of each registered file.

Processing for the software based methodology may include: capturing client reads for each registered file; for each captured client read, if the read is for updated data, returning the data from the cache; for each captured client read, if the read is for non-updated data, returning the data from the registered file; capturing writes to each registered file; for each captured write to a registered file, prior to allowing the captured write to complete, saving a pre-image of the appropriate data block of the registered file to a cache if the given data block of the registered file has no previously saved pre-image in the cache.

Processing for the hardware based methodology may include: capturing client reads for each registered file; for each captured client read, returning the data from a mirrored volume; allowing normal write processing to a primary volume for all write requests, without capturing them.

In step 508, each registered file may be processed such that the snapshot is consistent with the state of each registered file at the point in time of the start of the snapshot software component technology. In the case of a database snapshot, the database snapshot may be consistent with the state of the database at the point in time of the start of the snapshot software component technology. Snapshot processing each registered file may include copying a pre-image version of updated data to the cache. The location from which the pre-image version of updated data is retrieved during snapback processing may be dependent upon the chosen methodology (i.e., software based or hardware based). If the chosen methodology is the software based methodology, the location from which the pre-image version of updated data is retrieved during the snapback may be the memory cache or alternatively may be the disk cache. If the chosen methodology is the hardware based methodology, the location from which the pre-image version of updated data is retrieved during the snapback may be the intelligent storage device.

In one embodiment, the snapshot software component technology may be stopped when deemed appropriate by the client utility in order to prepare for snapback of the registered files. After the snapback has completed, termination processing may be executed.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method of recovering data from one or more file snapshots in a computer system, the method comprising:
    creating one or more file snapshots over a user-specified time interval at a user-specified frequency;
    monitoring for a recovery indication during the user-specified time interval, wherein receiving the recovery indication indicates a problem with the data; and
    restoring one or more pre-update snapshot images upon notification that the recovery indication was received.

2. The method of claim 1, wherein restoring one or more pre-update snapshot images upon notification that the recovery indication was recieved comprises:
    (a) restoring a first pre-update snapshot image of the one or more pre-update snapshot images;
    (b) testing the data to determined if the problem is resolved;
    (c) restoring a second pre-update snapshot image if the problem still exists; and
    (d) repeating (b) and (c) until the problem is resolved.

3. The method of claim 1, wherein creating each file snapshot of the one or more file snapshots comprises:
    registering one or more files with a snapshot software component technology, wherein said registering is performed using a file backup and recovery management utility;
    the snapshot software component technology determining an appropriate methodology to handle read requests and write requests received during the file snapshot of each registered file;
    starting the snapshot software component technology;
    the file backup and recovery management utility snapshot processing each registered file such that the file snapshot is consistent with the state of each registered file at the point in time of the start of the snapshot software component technology;
    wherein read requests and write requests are operable to be performed concurrently with said snapshot processing each registered file.

4. The method of claim 3, further comprising processing read requests from the registered files and write requests to the registered files concurrently with said snapshot processing each registered file.

5. The method of claim 3, wherein the snapshot software component technology determining an appropriate methodology to handle read requests and write requests received during the file snapshot of each registered file comprises:
    choosing the appropriate methodology for each registered file independent of the chosen methodology for the other registered files; and
    choosing one of the following methodologies for each registered file: a software based methodology using a memory cache, a software based methodology using a disk cache, or a hardware based methodology using one or more intelligent storage devices.

6. The method of claim 5, wherein, when the methodology used to handle read requests and write requests received during the file snapshot of each registered file is the software based methodology, the snapshot software component technology handling read requests received during the file snapshot of each registered file comprises:
    capturing client reads for each registered file;
    for each captured client read, if the read is for updated data, returning the data from the cache; and
    for each captured client read, if the read is for non-updated data, returning the data from the registered file.

7. The method of claim 3, wherein, when the methodology used to handle read requests and write requests received during the file snapshot of each registered file is the software based methodology, the snapshot software component technology handling write requests received during the file snapshot of each registered file comprises:
    capturing writes to each registered file; and
    for each captured write to a registered file, prior to allowing the captured write to complete, saving a pre-image of an appropriate data block of the registered file to a cache if the appropriate data block of the registered file has no previously saved pre-image in the cache.

8. The method of claim 3, wherein, when the methodology used to handle read requests and write requests received during the file snapshot of each registered file is the hardware based methodology, the snapshot software component technology handling read requests received during the file snapshot of each registered file comprises:

capturing client reads for each registered file; and for each captured client read, returning the data from a mirrored volume.

9. The method of claim 3, wherein, when the methodology used to handle read requests and write requests received during the file snapshot of each registered file is the hardware based methodology, the snapshot software component technology handling write requests received during the file snapshot of each registered file comprises allowing normal write processing to a primary volume.

10. The method of claim 3, wherein the file backup and recovery management utility snapshot processing each registered file comprises copying a pre-image version of updated data to a cache.

11. (Original) The method of claim 10, wherein the location from which the pre-image version of updated data is retrieved is dependent upon the chosen methodology.

12. The method of claim 11, wherein
the chosen methodology is the software based methodology; and
the location from which the pre-image version of updated data is retrieved is the memory cache.

13. The method of claim 11, wherein
the chosen methodology is the software based methodology; and
the location from which the pre-image version of updated data is retrieved is the disk cache.

14. The method of claim 11, wherein
the chosen methodology is the hardware based methodology; and
the location from which the pre-image version of updated data is retrieved is the one or more intelligent storage devices.

15. The method of claim 3, further comprising:
performing initialization processing prior to registering one or more files with the snapshot software component technology, wherein the initialization processing operates to prepare the one or more files for the snapshot;
stopping the snapshot software component technology, after the file backup and recovery management utility completes snapshot processing the one or more registered files; and
performing termination processing, after stopping the snapshot software component technology.

16. The method of claim 1, wherein creating each file snapshot of the one or more file snapshots comprises:
registering one or more files with a snapshot software component technology, wherein said registering is performed using a file backup and recovery management software utility;
the snapshot software component technology determining an appropriate methodology to handle read requests and write requests received during the file snapshot of each registered file;
starting the snapshot software component technology;
allowing concurrent read requests from the registered files and write requests to the registered files after the start of the snapshot software component technology; and
the file backup and recovery management software utility snapshot processing each registered file such that the file snapshot is consistent with the state of each registered file at the point in time of the start of the snapshot software component technology.

17. A method of restoring data from one or more database snapshots in a computer system, the method comprising:

creating one or more database file snapshots over a user-specified time interval at a user-specified frequency;

monitoring for a recovery indication during the user-specified time interval;

wherein receiving the recovery indication indicates a problem with the data; and restoring one or more pre-update snapshot images upon notification that the recovery indication was received.

18. The method of claim 17, wherein restoring one or more pre-update snapshot images upon notification that the recovery indication was received comprises:
(a) restoring a first pre-update snapshot image of the one or more pre-update snapshot images;
(b) testing the data to determine if the problem is resolved;
(c) restoring a second pre-update snapshot image if the problem still exists; and
(d) repeating (b) and (c) until the problem is resolved.

19. The method of claim 17, wherein creating each database file snapshot of the one or more database file snapshots comprises:
registering one or more database files associated with a database with a snapshot software component technology, wherein said registering is performed using a database backup and recovery management utility;
the snapshot software component an appropriate methodology to handle read requests and write requests received during the database snapshot of each registered database file;
starting the snapshot software component technology;
the database backup and recovery management utility snapshot processing each registered database file such that the database snapshot is consistent with the state of each registered database file at the point in time of the start of the snapshot software component technology;
wherein read requests and write requests are operable to be performed concurrently with said snapshot processing each registered database file.

20. The method of claim 19, wherein prior to starting the snapshot software component technology, the method further comprises:
stopping the database;
quiescing the database; and
wherein prior to the database backup and recovery management utility snapshot processing each registered database file, the method further comprises restarting the database.

21. The method of claim 20, wherein quiescing the database further comprises shutting the database down.

22. The method of claim 19, further comprising:
database objects associated with the database;
wherein prior to starting the snapshot software component technology, the method further comprises:
placing the database objects in an extended logging mode;
wherein prior to the database backup and recovery management utility snapshot processing each registered database file, the method further comprises:
removing the database objects from the extended logging mode; and
synchronizing the database.

23. The method of claim 22, wherein the database is Oracle and the extended logging mode is backup mode.

24. The method of claim 19, further comprising processing read requests from the registered database files and write requests to the registered database files concurrently with said snapshot processing each registered database file.

25. The method of claim 19, wherein the snapshot software component technology determining an appropriate methodology to handle read requests and write requests received during the database snapshot of each registered database file comprises:
   choosing the appropriate methodology for each registered database file independent of the chosen methodology for the other registered database files; and
   choosing one of the following methodologies for each registered database file: a software based methodology using a memory cache, a software based methodology using a disk cache, or a hardware based methodology using one or more intelligent storage devices.

26. The method of claim 25, wherein, when the methodology used to handle read requests and write requests received during the database snapshot of each registered database file is the software based methodology, the snapshot software component technology handling read requests received during the database snapshot of each registered database file comprises:
   capturing client reads for each registered database file;
   for each captured client read, if the read is for updated data, returning the data from the cache; and
   for each captured client read, if the read is for non-updated data, returning the data from the registered database file.

27. The method of claim 25, wherein, when the methodology used to handle read requests and write requests received during the database snapshot of each registered database file is the software based methodology, the snapshot software component technology handling write requests received during the database snapshot of each registered database file comprises:
   capturing writes to each registered database file; and
   for each captured write to a registered database file, prior to allowing the captured write to complete, saving a pre-image of an appropriate data block of the registered file to a cache if the appropriate data block of the registered file has no previously saved pre-image in the cache.

28. The method of claim 25, wherein, when the methodology used to handle read requests and write requests received during the database snapshot of each registered database file is the hardware based methodology, the snapshot software component technology handling read requests received during the database snapshot of each registered database file comprises:
   capturing client reads for each registered database file; and
   for each captured client read, returning the data from a mirrored volume.

29. The method of claim 25, wherein, when the methodology used to handle read requests and write requests received during the database snapshot of each registered database file is the hardware based methodology, the snapshot software component technology handling write requests received during the database snapshot of each registered database file comprises allowing normal write processing to a primary volume.

30. The method of claim 25, wherein the database backup and recovery management utility snapshot processing each registered database file comprises copying a pre-image version of updated data to a cache.

31. The method of claim 30, wherein the location from which the pre-image version of updated data is retrieved is dependent upon the chosen methodology.

32. The method of claim 31, wherein
   the chosen methodology is the software based methodology; and
   the location from which the pre-image version of updated data is retrieved is the memory cache.

33. The method of claim 31, wherein
   the chosen methodology is the software based methodology; and
   the location from which the pre-image version of updated data is retrieved is the disk cache.

34. The method of claim 31, wherein
   the chosen methodology is the hardware based methodology; and
   the location from which the pre-image version of updated data is retrieved is the one or more intelligent storage devices.

35. The method of claim 19, further comprising:
   performing initialization processing prior to registering one or more database files with the snapshot software component technology, wherein the initialization processing operates to prepare the one or more database files for the snapshot;
   stopping the snapshot software component technology, after the database backup and recovery management utility completes snapshot processing the one or more registered database files; and
   performing termination processing, after stopping the snapshot software component technology.

* * * * *

UNITED STATES PATENT AND TRADEMARK OFFICE
CERTIFICATE OF CORRECTION

PATENT NO. : 6,799,189 B2
DATED : September 28, 2004
INVENTOR(S) : Vernon F. Huxoll It is certified that error appears in the above-identified patent and that said Letters Patent is hereby corrected as shown below:

Column 13,
Line 15, please delete "(Original)"

Signed and Sealed this

Fifteenth Day of March, 2005

JON W. DUDAS
*Director of the United States Patent and Trademark Office*